United States Patent Office 2,796,419
Patented June 18, 1957

---

2,796,419

LYSERGIC ACID, INTERMEDIATES AND PREPARATION

Edmund C. Kornfeld, Granville Bruce Kline, and Eugene J. Fornefeld, Indianapolis, Ind., assignors to Eli Lilly and Company, Indianapolis, Ind., a corporation of Indiana No Drawing. Application September 27, 1954, Serial No. 458,674

74 Claims. (Cl. 260—285.5)

This invention relates to the synthesis of lysergic acid and more particularly to novel processes and products useful for the preparation of lysergic acid and homologues thereof.

Lysergic acid, and its homologues which can be prepared by the process of this invention, can be represented by the formula

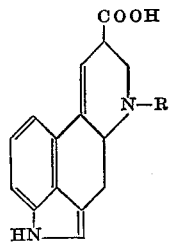

wherein R represents an alkyl radical having from one to eight carbon atoms.

This invention also comprehends the preparation of new intermediate compounds which are useful in the process of preparing lysergic acid and its N-alkyl homologues, such intermediate compounds being within the scope of the invention.

As is well known, lysergic acid (represented by the above formula when R is methyl) can be converted to ergot alkaloids and derivatives thereof. Thus, for example, by the interreaction of d-lysergic acid ester with hydrazine to produce lysergic acid hydrazide, followed by transformation to the azide and condensing with d-2-aminopropanol-1, according to the process of U. S. Patent 2,090,430, there is obtained ergonovine, a useful oxytocic compound.

Some of the intermediate and final compounds of the invention are novel tetracyclic structures to which no trivial names have yet been assigned. They can be named according to the scheme set forth in the Ring Index, Reinhold Publishing Company, 1940, as structure No. 2439, but such a scheme of nomenclature is long and complicated. The compounds are much more conveniently named with reference to the basic tetracyclic ring structure which is represented by the structural formula

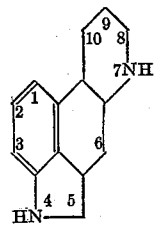

We have denominated the above ring system ergolane. The numbering of the ring system conforms to that of the Ring Index, to avoid confusion, and to enable ready transposition of the Ring Index and trivial names.

The general course of the process of the invention is illustrated by the following series of equations, in which R represents an acyl radical, $R_1$ represents an alkyl radical, $R_2$ represents lower alkyl radicals and X represents a halogen of the group consisting of chlorine and bromine.

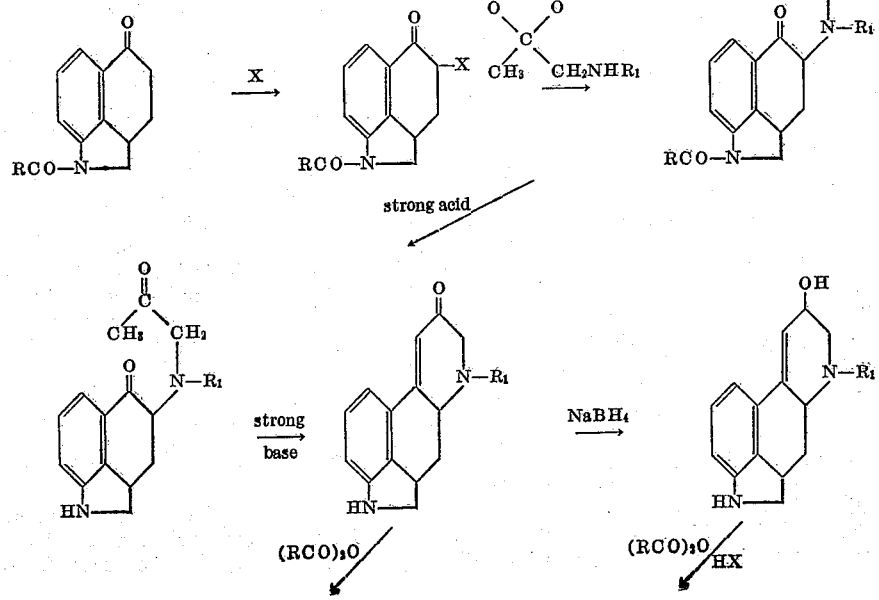

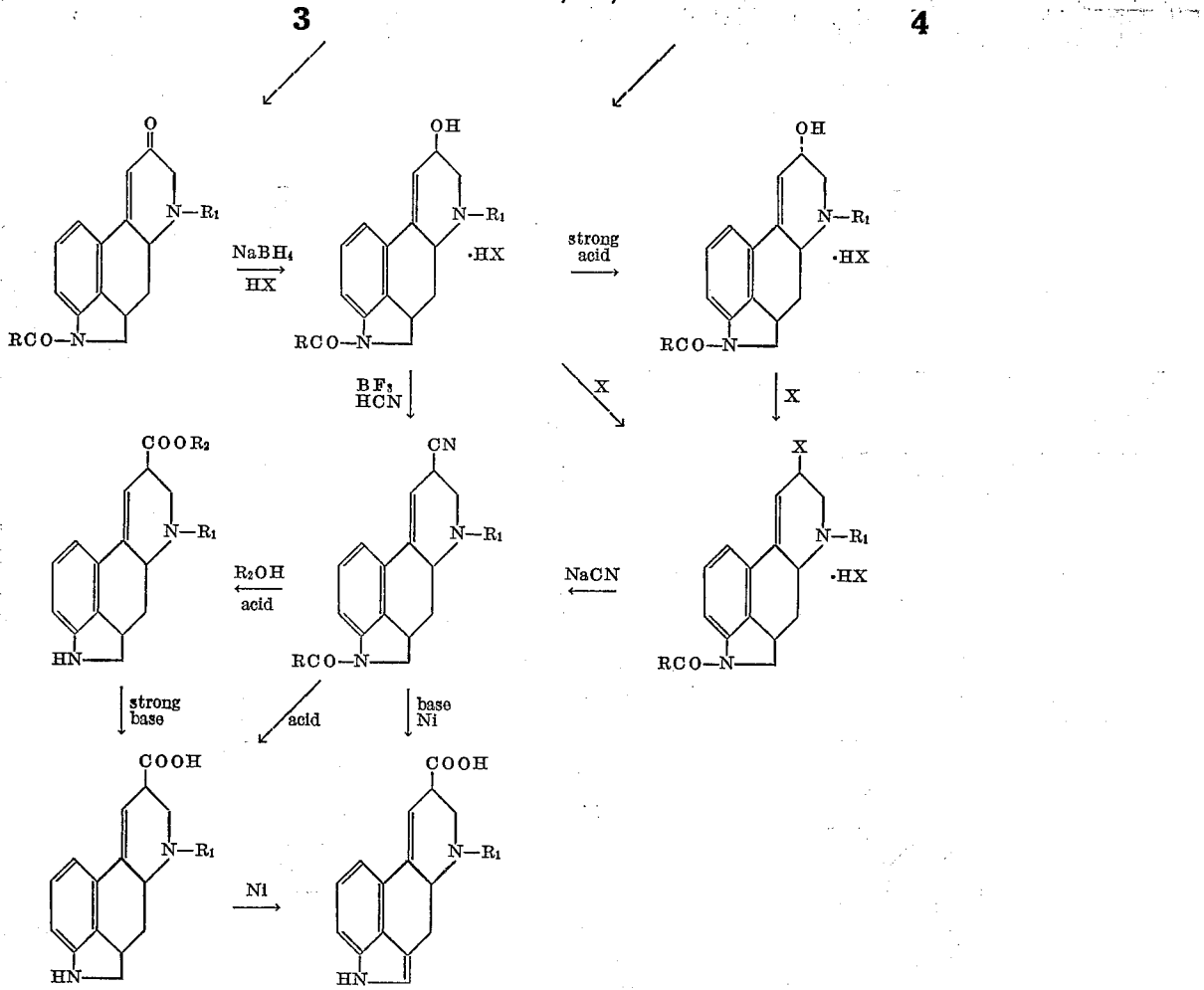

Referring to the series of equations, wherein the tetracyclic compounds are named by reference to the ergolane structure, the course of the process is as follows:

An N - acyl - 5 - keto - 1,2,2a,3,4,5 - hexahydrobenz[cd]indole is halogenated to form the corresponding N-acyl - 4 - halo - 5 - keto - 1,2,2a,3,4,5 - hexahydrobenz[cd]indole. The halo-ketone is treated with an alkylaminoacetone ketal, here illustrated by an alkylaminoacetone ethylene ketal, to produce an N-acyl-5-keto-4-alkylacetonylamino - 1,2,2a,3,4,5 - hexahydrobenz[cd]indole ethylene ketal, which upon treatment with strong acid is converted to the corresponding di-keto compound, 5 - keto - 4 - alkylacetonylamino - 1,2,2a,3,4,5 - hexahydrobenz[cd]indole. Upon treatment with a strong base, the diketone undergoes ring closure with the formation of a tetracyclic ketone which can be designated as 7 - alkyl - 9 - keto - $\Delta^{10}$ - ergolene (9 - keto - 7 - alkyl-4,5,5a,6,6a,7,8,9 - octahydroindolo - (4.3 - fg) quinoline). The tetracyclic ketone upon treatment with sodium borohydride is reduced to 7 - alkyl - 9 - hydroxy - $\Delta^{10}$ - ergolene (9 - hydroxy - 7 - alkyl - 4,5,5a,6,6a,7,8,9 - octahydroindolo(4.3-fg)-quinoline). Acylation of this compound, followed by treatment with a hydrogen halide, produces the corresponding acid addition salt of 4-acyl-7-alkyl - 9 - hydroxy - $\Delta^{10}$ - ergolene (4 - acyl - 9 - hydroxy-7 - alkyl - 4,5,5a,6,6a,7,8,9 - octahydroindolo(4.3-fg) quinoline). Alternatively, the 7 - alkyl - 9 - keto - $\Delta^{10}$-ergolene can be acylated, and then treated with sodium borohydride to form the corresponding 4-acyl-7-alkyl-9-hydroxy - $\Delta^{10}$ - ergolene, the hydrogen halide acid addition salt of which upon treatment with a thionyl halide forms 4 - acyl - 7 - alkyl - 9 - halo - $\Delta^{10}$ - ergolene hydrohalide (4 - acyl - 9 - halo - 7 - alkyl - 4,5,5a,6,6a,7,8,9-octahydroindolo(4.3-fg) - quinoline hydrohalide). Upon treatment of the halo - ergolene with sodium cyanide in liquid hydrogen cyanide there is produced the corresponding 4 - acyl - 7 - alkyl - 9 - cyano - $\Delta^{10}$ - ergolene (4 - acyl-9 - cyano - 7 - alkyl - 4,5,5a,6,6a,7,8,9 - octahydroindolo-(4.3-fg)quinoline). Alternatively, this compound can be prepared directly from 4-acyl-9-hydroxy-7-alkyl-$\Delta^{10}$-ergolene by the action of boron trifluoride in liquid hydrogen cyanide. Furthermore, the introduction of the cyano group can be carried out using a 7-alkyl-9-hydroxy-$\Delta^{10}$-ergolene by either of the methods broadly set forth, followed by acylation to produce the corresponding 4-acyl-7 - alkyl - 9 - cyano - $\Delta^{10}$ - ergolene. Again alternatively, the 4 - acyl - 7 - alkyl - 9 - hydroxy - $\Delta^{10}$ - ergolene can be epimerized by treatment with strong mineral acid, to produce a 4 - acyl - 7 - alkyl - 9 - epi hydroxy - $\Delta^{10}$ - ergolene, which can be halogenated to yield a 4-acyl-7-alkyl - 9 - halo - $\Delta^{10}$ - ergolene, from which the 4 - acyl-7 - alkyl - 9 - cyano - $\Delta^{10}$ - ergolene is prepared as already described. By reaction of the 9 - cyano ergolene with an alcohol in acid medium, followed by treatment with a weak base, the cyano group is alcoholized, and the N-acyl group is removed to yield 7-alkyl-9-carbalkoxy-$\Delta^{10}$-ergolene (9 - carbalkoxy - 7 - alkyl - 4,5,5a,6,6a,7,8,9 - octahydroindolo-(4.3-fg)quinoline). Hydrolysis of the carbalkoxy derivative with a strong acid or strong base produces the corresponding 7-alkyl-9-carboxy-$\Delta^{10}$-ergolene (9 - carboxy - 7 - alkyl - 4,5,5a,6,6a,7,8,9 -octahydroindolo(4.3-fg)quinoline), which when treated with deactivated Raney nickel produces a 7-alkyl-9-carboxy-$\Delta^{5,10}$-ergoladiene, which is lysergic acid when the 7-alkyl group is a methyl group, or a homologue of lysergic acid when the 7-alkyl group is other than methyl.

It will be understood that while each of the compounds described herein as intermediates in the synthesis of lysergic acid can be isolated and purified, such is not necessary for the successful operation of the process if the by-products of any reaction do not interfere with further procedures, or are eliminated in the course of the preparation of the intermediate compound. Thus two or more process steps can often be combined, as will be obvious to the art.

The invention is further illustrated by the following examples which illustrate novel processes and compounds included in this invention, and equivalents thereof.

EXAMPLE 1

*Preparation of N - benzoyl - 5 - keto - 1,2,2a,3,4,5 - hexahydrobenz[cd]indole*

A mixture of 118 g. (0.4 mol) of N - benzoylindoline-3-propionic acid (prepared according to the method of Robinson, J. Chem. Soc., 1931, 3158), and 220 ml. of thionyl chloride was allowed to stand at room temperature for one-half hour, and thereafter was warmed gently on a steam bath for about twenty minutes. The excess thionyl chloride was evaporated in vacuo, and the residue, comprising N-benzoylindoline - 3 - propionyl chloride, was dissloved in 200 ml. of dry carbon disulfide. The solution was added in a thin stream to a vigorously stirred suspension of 240 g. of aluminum chloride in 1750 ml. of carbon disulfide. The mixture was refluxed and stirred for one hour and treated with a mixture of 500 g. of ice, 250 ml. of concentrated hydrochloric acid, and 500 ml. of water. The mixture was stirred during the addition of the ice mixture, and was cooled by intermittently distilling a portion of the carbon disulfide in vacuo. After addition of all of the ice mixture, the carbon disulfide remaining was distilled in vacuo and the aqueous residue was extracted with two liters of benzene. The benzene extract was washed with dilute sodium hydroxide solution, was dried over magnesium sulfate, and was evaporated in vacuo to a small volume. Several volumes of petroleum ether were added slowly to the concentrate whereupon a yellow crystalline precipitate of N - benzoyl-5 - keto - 1,2,2a,3,4,5 - hexahydrobenz[cd]indole separated. The precipitate was filtered off, washed with petroleum ether, and recrystallized from benzene-petroleum ether mixture. After recrystallization from benzene-petroleum ether mixture, it melted at about 146–147° C.

The acylated 5-keto-polyhydrobenz[cd]indole prepared according to the method of this example can contain as the acyl substitutent any member of the group represented by the formula R—CO—, wherein R represents a member of the group consisting of alkyl radicals having from one to eight carbon atoms, monocarbocyclic aromatic radicals, lower alkyl-substituted monocarbocyclic aromatic radicals, and monocarbocyclic-aromatic-substituted lower alkyl radicals. Thus, for example, when N-acetyl-indoline-3-propionic acid is employed as a starting material, N-acetyl-5-keto-1,2,2a,3,4,5-hexahydrobenz[cd]indole, melting at about 177.5–178.5° C. is produced. Similarly, the use of N-phenylacetyl-indoline-3-propionic acid and N-p-ethylbenzoyl-indoline-3-propionic acid as starting materials for the synthesis yields N-phenylacetyl-5-keto-1,2,2a,3,4,5-hexahydrobenz[cd]indole and N - p - ethylbenzoyl - 5 - keto - 1,2,2a,3,4,5-hexahydrobenz[cd]indole, respectively. By treating N-benzoyl-5-keto-1,2,2a,3,4,5-hexahydrobenz[cd] indole with concentrated hydrochloric acid in glacial acetic acid solution, the benzoyl group is removed to yield 5-keto-1,2,2a,3,4,5-hexahydrobenz[cd]indole, which melts at 126–127° C. after recrystallization from methanol. By reacting butyric anhydride with 5-keto-1,2,2a,3,4,5-hexahydrobenz[cd]indole in pyridine solution there is obtained N - butyryl - 5 - keto - 1,2,2a,3,4,5-hexahydrobenz[cd]indole, melting at about 137.5–138.5° C. after recrystallization from ethanol. By similar methods, using the appropriate acyl halide or anhydride, there are obtained the N-toluyl, valeryl, heptanoyl and the like acyl derivatives of 5-keto-1,2,2a,3,4,5-hexahydrobenz[cd]indole. All of the N-acylated 5-keto-polyhydrobenz[cd] indole compounds can be employed as intermediates for the further steps in the process.

EXAMPLE 2

*Preparation of N-benzoyl-4-bromo-5-keto-1,2,2a,3,4,5-hexahydrobenz[cd]indole*

A solution of 304.7 g. (1.1 mols) of N-benzoyl-5-keto-1,2,2a,3,4,5-hexahydrobenz[cd]indole in 2200 ml. of glacial acetic acid was warmed to about 40° C. The reaction mixture was illuminated with a 250 watt bulb, and 352 g. (1.1 mols) of pyridine hydrobromide perbromide was added in portions during a period of about five minutes, with shaking. The reaction mixture was warmed to about 60° C. and was kept at about 55–60° C. for about thirty minutes. The mixture was then treated with activated charcoal, filtered and evaporated to small volume in vacuo. The residue was dissolved in 2200 ml. of chloroform, the solution was washed several times with water, and dried over magnesium sulfate. The solvent was then removed by evaporation in vacuo. The residue was crystallized from 2200 ml. of a 1:1 mixture of acetic acid and ether. N-benzoyl-4-bromo-5-keto-1,2,2a,3,4,5-hexahydrobenz[cd]indole thus prepared melted at about 180.5–181.5° C.

Instead of the pyridine hydrobromide perbromide used in the procedure of this example, other halogenating agents can be used to prepare the corresponding N-benzoyl - 4 - halo - 5 - keto - 1,2,2a,3,4,5 - hexahydrobenz[cd]indole. Thus, for example, bromine or N-chlorosuccinimide can be used in the process.

The halogenation can be conducted over a range of temperatures of from about room temperature to about 75° C. Obviously, the reaction proceeds more rapidly at elevated temperatures.

Other polar solvents, as for example, dimethylformamide, acetonitrile, other lower aliphatic acids, chloroacetic acid, bromoacetic acid and the like can be employed.

When N-acetyl-5-keto-1,2,2a,3,4,5-hexahydrobenz[cd]indole is employed in the process of this example, N-acetyl - 4 - bromo - 5 - keto - 1,2,2a,3,4,5 - hexahydrobenz[cd]indole, melting at about 190° C., is produced.

Analogously, other N-acylated-5-keto-1,2,2a,3,4,5-hexahydrobenz[cd]indoles, as described in Example 1, can be halogenated by the method of this example. Such halogenated compounds are also useful intermediates in the process of this invention.

EXAMPLE 3

*Preparation of methylaminoacetone ethylene ketal*

A mixture of 1200 ml. of liquid methylamine and 300 g. of chloroacetone ethylene ketal was heated in a high pressure autoclave at 160–165° C. for about twenty-five hours. The reaction mixture was cooled and the excess methylamine was evaporated. The residue, comprising methylaminoacetone ethylene ketal, was dissolved in several volumes of ether. The ether solution was mixed with a solution of 130 g. of potassium hydroxide in 65 ml. of water, and was decanted from the sludge. The ethereal extract containing methylaminoacetone ethylene ketal formed in the reaction was dried over solid potassium hydroxide, the ether was removed by evaporation, and the residue was distilled. The portion boiling at 158–162° C. was collected, was dissolved in two liters of dry ether and dry hydrogen chloride gas was passed into the solution until precipitation of the hydrochloric acid addition salt of the base was complete. The methylaminoacetone ethylene ketal hydrochloride thus prepared melted at about 165–167° C. It can be represented by the formula

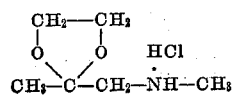

The methylaminoacetone ethylene ketal hydrochloride was suspended in one liter of dry ether, and to the mixture was added with stirring a solution of 110 g. of potassium hydroxide in 55 ml. of water. Sufficient excess solid potassium hydroxide was added to render the ether anhydrous, the ether layer was decanted, and the ether was evaporated. The residue was distilled yielding methylaminoacetone ethylene ketal which boiled at about 158–159° C.

In the place of the methylamine used above, other amines having from two to eight carbon atoms can be used in the process. Thus, by employing ethylamine, isopropylamine, butylamine and heptylamine in the process of this example the corresponding ethylaminoacetone ethylene ketal, isopropylaminoacetone ethylene ketal, butylaminoacetone ethylene ketal and heptylaminoacetone ethylene ketal, respectively, are produced. Similarly, other ketals, such as chloroacetone propylene ketal, can be employed to produce the corresponding aminoacetone ketals, as for example, methylaminoacetone propylene ketal. The aminoacetone ketals described are suitable for use in the process of the invention. Likewise, aminoacetone dialkyl ketals, wherein the amino group can be substituted with an alkyl radical having from one to eight carbon atoms, such as methylaminoacetone diethyl ketal, amylaminoacetone diethyl ketal, n-heptylaminoacetone diethyl ketal and the like can be used in the process to produce the corresponding N-benzoyl - 5 - keto - 4 - (N - alkyl - N - acetonyl) - amino-1,2,2a,3,4,5 - hexahydrobenz[cd]indole diethyl ketals, which can be treated with strong acid to form 5-keto-4-(N - alkyl - N - acetonyl) - amino - 1,2,2a,3,4,5 - hexahydrobenz[cd]indoles wherein the acetonylamino group is substituted with an alkyl radical having from one to eight carbon atoms.

EXAMPLE 4

*Preparation of N - benzoyl - 5-keto-4-(N-methyl-N-acetonyl) - amino - 1,2,2a,3,4,5 - hexahydrobenz[cd]indole ethylene ketal*

A mixture of 270 g. (0.76 mol) of N-benzoyl-4-bromo-5 - keto - 1,2,2a,3,4,5 - hexahydrobenz[cd]indole, 307 g. (2.35 mols) of methylaminoacetone ethylene ketal and 4500 ml. of dry benzene was refluxed under an atmosphere of nitrogen for about twenty-one hours. The reaction mixture was cooled, and a precipitate of methylaminoacetone ethylene ketal hydrobromide which separated from solution was removed by filtration. The filtrate was washed several times with one-liter portions of ice water, and then was extracted with three successive one-liter portions of cold dilute hydrochloric acid, each containing 150 ml. of 37 percent HCl. The acid extract was immediately added to an excess of ice-cold dilute sodium hydroxide solution. The alkaline mixture was extracted with one liter of chloroform, and the chloroform solution was dried over magnesium sulfate and decolorized with activated carbon. The decolorized chloroform solution was evaporated in vacuo to remove the chloroform. The residue, consisting of N-benzoyl-5 - keto - 4 - (N - methyl - N - acetonyl) - amino-1,2,2a,3,4,5-hexahydrobenz[cd]indole ethylene ketal, was crystallized from acetone. It melted at about 135–137° C.

Amino ketals substituted with alkyl groups containing from one to eight carbon atoms, as well as alkylene chains containing from two to four carbon atoms, and ordinary dialkyl ketals, as described in the previous example, can be used in preparation of the N-alkyl-N-acetonylamino polyhydrobenz[cd]indole ketals of this example. Similarly, other inert organic solvents can be used, such as toluene, heptane, xylene and the like.

The temperature at which the reaction is carried out can be varied from about 50° to about 150° C. Generally speaking, the reaction is more rapid at the higher temperatures.

4-halo-5-keto-polyhydrobenz[cd]indoles which are acylated with other acylating groups as described in preceding examples can be treated analogously by the process of the example to yield the corresponding N-acyl-4-(N-alkyl - N - acetonyl) - amino - 1,2,2a,3,4,5 - hexahydrobenz[cd]indole ketals.

EXAMPLE 5

*Preparation of 5-keto-4-(N-methyl-N-acetonyl)-amino-1,2,2a,3,4,5-hexahydrobenz[cd]indole*

A solution of 20 g. of N-benzoyl-5-keto-4-(N-methyl-N - acetonyl) - amino - 1,2,2a,3,4,5 - hexahydrobenz[cd]indole ethylene ketal in a mixture of 250 ml. of concentrated hydrochloric acid and 250 ml. of water was kept under an atmosphere of nitrogen at a temperature of 37° C. for about five days. The mixture was then cooled, treated with decolorizing carbon and filtered. The filtrate was concentrated to small volume in vacuo, and the residue containing the non-volatile portion of the reaction mixture, including 5-keto-4-(N-methyl-N-acetonyl) - amino - 1,2,2a,3,4,5 - hexahydrobenz[cd]indole in salt form, was treated with an excess of solid sodium bicarbonate. The alkaline residue was then extracted with three 100 ml. portions of chloroform. The combined chloroform extracts were evaporated to dryness in vacuo at room temperature. The dry residue was collected, powdered and slurried with about 75 ml. of a mixture of equal parts of benzene and ether. The benzene-ether solvent mixture was removed by filtration, leaving the solid, crystalline 5-keto-4-(N-methyl-N-acetonyl) - amino - 1,2,2a,3,4,5 - hexahydrobenz[cd]indole which melted at about 105–107° C. After recrystallization from a mixture of benzene and ether, the compound melted at about 109–110° C.

Other strong, non-oxidizing acids, e. g., hydrobromic and sulfuric acids, can be used for hydrolysis.

When other acylated 5-keto-4-(N-alkyl-N-acetonyl)-amino polyhydrobenz[cd]indole ketals are employed as starting materials, they are converted to the corresponding 5 - keto - 4 - (N - alkyl - N - acetonyl) - amino-1,2,2a,3,4,5-hexahydrobenz[cd]indoles. Thus, for example, when N - acetyl - 5 - keto - 4 - (N - methyl- N-acetonyl) - amino - 1,2,2a,3,4,5 - hexahydrobenz[cd]indole ethylene ketal is used, 5-keto-4-(N-methyl-N-acetonyl)-amino-1,2,2a,3,4,5-hexahydrobenz[cd]indole is obtained.

Similarly, when N-benzoyl-5-keto-4-(N-ethyl-N-acetonyl) - amino - 1,2,2a,3,4,5 - hexahydrobenz[cd]indole propylene ketal is employed in the reaction, 5-keto-4-(N-ethyl - N - acetonyl) - amino - 1,2,2a,3,4,5 - hexahydrobenz[cd]indole is produced.

The reaction involved in this step of the process of the invention can be conducted at temperature ranging from room temperature to about 100° C. However, the formation of undesirable dark colored by-products increases at the higher temperatures.

EXAMPLE 6

*Preparation of 9-keto-7-methyl-$\Delta^{10}$-ergolene*

1 g. of 5-keto-4-(N-methyl-N-acetonyl)-amino-1,2,2a,-3,4,5-hexahydrobenz[cd]indole was dissolved in 40 ml. of absolute alcohol while stirring under nitrogen at about 40° C. The solution was cooled to about —20° C. and 0.63 g. (3 equivalents) of sodium methoxide were added thereto. The solution was stirred at about —10° C. for about ten minutes during which time a crystalline precipitate of the desired product formed. The crystalline material was removed by filtration, and washed with successive portions of cold water, methanol and ether. The 9-keto-7-methyl-$\Delta^{10}$-ergolene thus prepared melted at about 145–147° C.

The dihydrochloride salt of 9-keto-7-methyl-$\Delta^{10}$-ergolene was prepared by the addition of the calculated amount of concentrated hydrochloric acid to a solution of 0.25 g. of the base in 5 ml. of acetone. After recrystallization from aqueous acetone, 9-keto-7-methyl-$\Delta^{10}$- ergolene dihydrochloride melted with decomposition at about 270° C.

Other strong bases can be employed to effect the ring closure of this procedure. Thus, for example, sodium ethoxide, potassium methoxide, potassium t-butoxide, sodium hydroxide, potassium hydroxide and other like strong bases can be used.

The reaction can be carried out at temperatures in the range of about −20° C. to about 35° C. Substantially any inert organic solvent can be employed in the reaction.

Starting materials for the procedure of this example can include other 5-keto-4-(N-alkyl-N-acetonyl)-amino-1,2,2a,3,4,5-hexahydrobenz[cd]indoles, as for example, 5-keto-4-(N-ethyl-, 5-keto-4-(N-propyl- and 5-keto-4-(N-n-heptyl-N-acetonyl) - amino - hexahydrobenz[cd]indole. In such cases, the final products are, respectively, 9-keto-7-ethyl-$\Delta^{10}$-ergolene, 9-keto-7-propyl-$\Delta^{10}$-ergolene and 9-keto-7-n-heptyl-$\Delta^{10}$-ergolene.

EXAMPLE 7

*Preparation of 9-hydroxy-7-methyl-$\Delta^{10}$-ergolene*

A mixture of 10 g. of 9-keto-7-methyl-$\Delta^{10}$-ergolene, 10 ml. of water and 200 ml. of methanol was treated with 1.5 g. of sodium borohydride. The mixture was stirred for about two hours, and was diluted with 150 ml. of methanol and 25 ml. of water. The aqueous mixture was heated to boiling, and treated with decolorizing carbon. The decolorized solution was concentrated to small volume in vacuo. A precipitate consisting of 9-hydroxy-7-methyl-$\Delta^{10}$-ergolene was formed. It was removed by filtration, washed with water and methanol and dried. The 9-hydroxy-7-methyl-$\Delta^{10}$-ergolene melted with decomposition at about 210–220° C.

To a solution of 1 g. of 9-hydroxy-7-methyl-$\Delta^{10}$-ergolene in 25 ml. of aqueous ethanol was added the calculated amount of concentrated hydrochloric acid. The dihydrochloride salt of 9-hydroxy-7-methyl-$\Delta^{10}$-ergolene which formed was recrystallized from aqueous acetone and melted with decomposition at about 242–243° C.

In effecting the hydrogenation of the 9-keto-$\Delta^{10}$-ergolenes, other mild hydrogenating agents can be used in place of sodium borohydride. Such agents include lithium borohydride, zinc and acid, and the like.

The 9-keto-7-ethyl-$\Delta^{10}$-ergolene, 9-keto-7-propyl-$\Delta^{10}$-ergolene and 9-keto-7-n-heptyl-$\Delta^{10}$-ergolene described in Example 6 can be hydrogenated by the above procedure to produce the corresponding 9-hydroxy-7-ethyl-$\Delta^{10}$-ergolene, 9-hydroxy-7-propyl-$\Delta^{10}$-ergolene and 9-hydroxy-7-n-heptyl-$\Delta^{10}$-ergolene, respectively.

EXAMPLE 8

*Preparation of 4-acetyl-9-hydroxy-7-methyl-$\Delta^{10}$-ergolene*

A solution of 5 g. of 9-hydroxy-7-methyl-$\Delta^{10}$-ergolene in 100 ml. of ethanol was treated with 10 ml. of acetic anhydride. The reaction mixture was allowed to stand at room temperature for about two hours. The volatile portions of the reaction mixture were then removed by evaporation in vacuo and the residue comprising 4-acetyl-9-hydroxy-7-methyl-$\Delta^{10}$-ergolene, was taken up in warm ethyl acetate. The 4-acetyl-9-hydroxy-7-methyl-$\Delta^{10}$-ergolene separated in crystalline form, and was removed by filtration. The substance melted with decomposition at about 182–184° C.

Other 9-hydroxy-7-alkyl-$\Delta^{10}$-ergolenes can be acylated using the procedure of this example, to yield the corresponding 4-acyl-9-hydroxy-7-alkyl-$\Delta^{10}$-ergolenes.

The hydrochloride salt of 4-acetyl-9-hydroxy-7-methyl-$\Delta^{10}$-ergolene is prepared by addition of the theoretical amount of hydrochloric acid to an ethanol solution of the base, whereupon crystalline 4-acetyl-9-hydroxy-7-methyl-$\Delta^{10}$-ergolene hydrochloride separates. On recrystallization from aqueous ethanol, the salt melts with decomposition at about 248–250° C.

When other acid anhydrides, as for example, propionic anhydride, benzoic anhydride, butyric anhydride, and phenylacetic anhydride are used, the corresponding 4-propionyl-, 4-benzoyl-, 4-butyryl-, and 4-phenylacetyl-9-hydroxy-7-methyl-$\Delta^{10}$-ergolene, respectively are obtained. Thus there can be employed for acylation those acid anhydrides having the formula $(RCO)_2O$, wherein R represents an aliphatic radical having from one to eight carbon atoms, a monocarbocyclic aromatic radical, or a monocarbocyclic aromatic-substituted lower alkyl radical.

EXAMPLE 9

*Preparation of 4-acetyl-9-chloro-7-methyl-$\Delta^{10}$-ergolene*

To a solution of 3.1 g. of 4-acetyl-9-hydroxy-7-methyl-$\Delta^{10}$-ergolene hydrochloride in about 75 ml. of liquid sulfur dioxide were added 1.2 ml. of thionyl chloride. The mixture was placed in a glass-lined autoclave and maintained at about 25° C. for about five hours. The autoclave was then opened, the reaction mixture was removed, and the sulfur dioxide was allowed to evaporate while keeping the volume of the solution constant by the slow addition of anhydrous ether. An amorphous precipitate of the hydrochloride salt of the 4-acetyl-9-chloro-7-methyl-$\Delta^{10}$-ergolene formed. It was removed by filtration, washed with ether and dried in vacuo. The substance melted with decomposition at about 130–135° C.

By employing 4-benzoyl-9-hydroxy-7-methyl-$\Delta^{10}$-ergolene hydrochloride in the reaction, 4-benzoyl-9-chloro-7-methyl-$\Delta^{10}$-ergolene hydrochloride is obtained. Analogously, when 4-acetyl-9-hydroxy-7-propyl-$\Delta^{10}$-ergolene hydrochloride is employed, 4-acetyl-9-chloro-7-propyl-$\Delta^{10}$-erogelene hydrochloride is obtained, and when 4-acetyl-9-hydroxy-7-ethyl-$\Delta^{10}$-ergolene hydrochloride is used, 4-acetyl-9-chloro-7-ethyl-$\Delta^{10}$-ergolene hydrochloride is produced.

When thionyl bromide and the corresponding hydrogen bromide acid addition salts of the named compounds are used in the method of this example, correspondingly substituted 9-bromo-$\Delta^{10}$-ergolene hydrogen bromide acid addition salts are produced. Thus, for example, when the procedure of this example is repeated using 4-acetyl-9-hydroxy-7-methyl-$\Delta^{10}$-ergolene hydrobromide and thionyl bromide, 4-acetyl-9-bromo-7-methyl-$\Delta^{10}$-ergolene hydrobromide melting with decomposition at about 125–130° C. is obtained.

The halogenation procedure of this example can be conducted at temperatures in the range of about 0° C. to 50° C. While the reaction proceeds satisfactorily at even higher temperatures, the formation of dark colored byproducts increases rapidly with the increase of temperature, and renders isolation of the desired compounds much more difficult.

EXAMPLE 10

*Preparation of 4-acetyl-9-cyano-7-methyl-$\Delta^{10}$-ergolene*

To 300 ml. of ice-cold liquid hydrogen cyanide were added 40 g. of dry powdered sodium cyanide, and the mixture was stirred and cooled in ice while 7.5 g. of amorphous 4-acetyl-9-chloro-7-methyl-$\Delta^{10}$-ergolene hydrochloride were added. Stirring of the reaction mixture was continued for about thirty minutes. The hydrogen cyanide was then quickly removed from the reaction mixture by distillation under reduced pressure at a temperature below 10° C. The residue from the distillation was treated with a mixture of chloroform and ice water, and the resulting mixture was filtered. The chloroform was separated from the aqueous layer of the filtrate, and the aqueous phase was extracted with two 100 ml. portions of chloroform. The combined chloroform extracts containing the 4-acetyl-9-cyano-7-methyl-$\Delta^{10}$-ergolene were dried over anhydrous magnesium sulfate, and were then treated with decolorizing carbon and filtered. The chloroform was removed from the decolorized filtrate by distillation in vacuo. The residue was crystallized from ethyl acetate yielding 4-acetyl-9-cyano-7-methyl-$\Delta^{10}$-ergolene which melted at about 180–181° C.

Other metal cyanides can be used in the reaction, such as potassium cyanide, lithium cyanide, calcium cyanide, cuprous cyanide and the like.

By following the procedure of this example, but using the hydrohalide salts of 4-benzoyl-9-chloro-7-methyl-$\Delta^{10}$-ergolene, 4-acetyl-9-bromo-7-ethyl-$\Delta^{10}$-ergolene, and 4-acetyl-9-chloro-7-n-heptyl-$\Delta^{10}$-ergolene, the corresponding 4-benzoyl-9-cyano-7-methyl-$\Delta^{10}$ergolene, 4-acetyl-9-cyano-7-ethyl-$\Delta^{10}$-ergolene, and 4-acetyl-9-cyano-7-n-heptyl-$\Delta^{10}$-ergolene are obtained.

EXAMPLE 11

*Alternative preparation of 4-acetyl-9-cyano-7-methyl-$\Delta^{10}$-ergolene from 4-acetyl-9-hydroxy-7-methyl-$\Delta^{10}$-ergoline*

To 25 ml. of liquid hydrogen cyanide cooled in crushed ice were added 0.5 g. of 4-acetyl-9-hydroxy-7-methyl-$\Delta^{10}$-ergolene. A stream of gaseous boron trifluoride was bubbled into the cooled mixture until all of the ergolene had dissolved. The reaction mixture was maintained at about 0° C. for about two hours longer, and was then concentrated by evaporation in vacuo to a gummy residue. About 5 ml. of ethanol and a few drops of dilute hydrochloric acid were added to the residue, and the resulting mixture was neutralized with solid sodium bicarbonate. The neutral residue containing the 4-acetyl-9-cyano-7-methyl-$\Delta^{10}$-ergolene formed in the reaction, was extracted with three 25 ml. portions of chloroform, and the combined chloroform extracts were dried over anhydrous magnesium sulfate. The chloroform was removed from the anhydrous solution by distillation in vacuo. The residue from distillation was dissolved in 25 ml. of an anhydrous mixture of approximately equal parts of methanol and ether, and anhydrous hydrogen chloride gas was bubbled through the solution until no further precipitation occurred. The crude hydrochloride salt of 4-acetyl-9-cyano-7-methyl-$\Delta^{10}$-ergolene thus prepared was converted to the free base by treating the solid crude substance with 15 ml. of aqueous sodium bicarbonate solution. The alkaline aqueous solution was extracted with several 20 ml. portions of chloroform, and the combined chloroform extracts were dried over anhydrous magnesium sulfate, concentrated to a volume of about 10 ml. and placed upon a chromatographic column containing about 20 g. of alumina. The free base of the 4-acetyl-9-cyano-7-methyl-$\Delta^{10}$-ergolene was eluted from the column using a mixture of four parts of chloroform to one part of petroleum ether as the eluent. The first 100 ml. of eluate which were recovered were evaporated in vacuo to remove the solvents. The residue was an oil which crystallized after being dissolved in warm methanol and cooled. The 4-acetyl-9-cyano-7-methyl-$\Delta^{10}$-ergolene thus prepared melted at about 180–181° C., and exhibited no depression of the melting point when mixed with the product obtained by the process of Example 10.

EXAMPLE 12

*Preparation of 9-carbomethoxy-7-methyl-$\Delta^{10}$-ergolene*

A mixture of 1 g. of 4-acetyl-9-cyano-7-methyl-$\Delta^{10}$-ergolene, 15 ml. of methanol, and 0.25 of water was cooled, and 2 ml. of concentrated sulfuric acid were slowly added thereto. The resulting solution was sealed in a glass tube under nitrogen and was heated at about 100° C. for about twenty-four hours. The sealed tube was cooled and opened, and the reaction mixture was treated with decolorizing carbon, filtered and concentrated in vacuo to a volume of about 5 ml. The concentrated reaction mixture was poured over a mixture of about 30 ml. of chloroform, 50 g. of crushed ice, and 10 g. (an excess amount) of sodium bicarbonate. After the ice had melted, the chloroform was separated from the aqueous phase, and the aqueous phase was extracted with three 10 ml. portions of chloroform. The combined extracts containing the 9-carbomethoxy-1-methyl-$\Delta^{10}$-ergolene were rendered water-free over anhydrous magnesium sulfate and the chloroform was removed by evaporation in vacuo. The residue was crystallized from benzene. Crystalline 9-carbomethoxy-7-methyl-$\Delta^{10}$-ergolene thus prepared melted at about 160–161° C.

Any lower alkanol such as methanol, isopropanol and the like can be employed in the reaction, to yield the corresponding 9-carbalkoxy-7-methyl-$\Delta^{10}$-ergolene. Other strong mineral acids can likewise be used, such as hydrochloric acid, hydrobromic acid and the like. Similarly, the 4-acyl-9-cyano-7-alkyl-$\Delta^{10}$-ergolenes such as 4-acetyl-9-cyano-7-ethyl-$\Delta^{10}$-ergolene, 4-acetyl-9-cyano-7-propyl-$\Delta^{10}$-ergolene, and 4-acetyl-9-cyano-7-n-heptyl-$\Delta^{10}$-ergolene can be used as starting materials for this process step of this invention, to yield the corresponding 9-carbomethoxy-7-ethyl, 9-carbomethoxy-7-propyl, and 9-carbomethoxy-7-n-heptyl-$\Delta^{10}$-ergolene, respectively.

Other 4-acyl-9-cyano-7-methyl-$\Delta^{10}$-ergolenes, such as 4-benzoyl-9-cyano-7-methyl-$\Delta^{10}$-ergolene, can also be used in the process.

The reaction can be conducted at atmospheric pressure at a temperature somewhat above room temperature, to obtain the 9-carbalkoxy ergolenes; but the use of a temperature in the range of about 100° to 150° C., and sealed vessels is preferred since the time required for the completion of the reaction is shortened.

EXAMPLE 13

*Preparation of dl-lysergic acid (9-carboxy-7-methyl-$\Delta^{5,10}$-ergoladiene)*

A mixture of 3.9 g. of 9-carbomethoxy-7-methyl-$\Delta^{10}$-ergolene and 78 ml. of 1.5 percent aqueous potassium hydroxide was refluxed under nitrogen for about one half hour. To the reaction mixture were added about 8.5 g. of hydrated sodium arsenate, and about 16 g. of Raney nickel, which had previously been deactivated by boiling in xylene suspension. The reaction mixture including the catalyst was refluxed with stirring under an atmosphere of nitrogen for about twenty hours. The reaction mixture was then treated with decolorizing carbon and filtered. The decolorized filtrate was adjusted to about pH 5.6 by the addition of aqueous 4 percent hydrochloric acid, whereupon crude dl-lysergic acid precipitated. The precipitate was separated by filtration and washed with water. The crude acid was rapidly dissolved in glacial acetic acid, and was precipitated in crystalline form by the addition of several volumes of water. dl-Lysergic acid thus prepared melted with decomposition at about 241–242° C. The infra-red absorption spectrum of a mineral oil mull of the material was indistinguishable from that of a mineral oil mull of authentic dl-lysergic acid prepared from ergot alkaloids. The crude lysergic acid can also be purified by precipitation from dilute aqueous ammonia by the addition of Dry Ice or gaseous carbon dioxide.

Any strong water-soluble base such as the alkali metal hydroxides, for example sodium hydroxide and the like, can be used for the hydrolysis step.

The Raney nickel which is used as a dehydrogenation catalyst can be deactivated by other methods, such as by warming with acetone, cyclohexanone, toluene and the like. The essential characteristic of the deactivation is the removal of the adsorbed hydrogen from the Raney nickel. Other dehydrogenation catalysts, such as palladium on carbon, palladium on alumina, platinum black, etc., can be used for dehydrogenation of the ergolene compound.

When other 9-carboalkoxy-$\Delta^{10}$-ergolenes are treated with strong base and deactivated Raney nickel, homologues of dl-lysergic acid are formed. Thus, when 9-carboethoxy-7-ethyl-$\Delta^{10}$-ergolene is used, dl-9-carboxy-7-ethyl-$\Delta^{5,10}$-ergoladiene is obtained. Similarly, 9-carbopropoxy-7-propyl-$\Delta^{10}$-ergolene yields dl-9-carboxy-7-propyl-$\Delta^{5,10}$-ergoladiene, and 9-carbomethoxy-7-heptyl-$\Delta^{10}$-ergolene yields 9-carboxy-7-heptyl-$\Delta^{5,10}$-ergoladiene.

EXAMPLE 14

*Alternative preparation of dl-lysergic acid from 4-acetyl-9-cyano-7-methyl-$\Delta^{10}$-ergolene*

One gram of 4-acetyl-9-cyano-7-methyl-$\Delta^{10}$-ergolene was suspended in 2 ml. of water containing one gram of sodium hydroxide, and was refluxed under a nitrogen atmosphere until the insoluble material was completely dissolved. Thereafter, about 8 grams of Raney nickel catalyst previously deactivated by boiling with xylene were added, and the mixture was refluxed for about eighteen hours. The reaction mixture was treated with decolorizing carbon, and filtered. The clear filtrate was adjusted to about pH 5.6, whereupon *dl*-lysergic acid precipitated. It was then crystallized according to the method of Example 13. The physical characteristics of the *dl*-lysergic acid thus prepared accorded with those of authentic *dl*-lysergic acid.

EXAMPLE 15

*Preparation of 4-acetyl-9-keto-7-methyl-$\Delta^{10}$-ergolene from 9-keto-7-methyl-$\Delta^{10}$-ergolene*

To a solution of 0.5 g. of 9-keto-7-methyl-$\Delta^{10}$-ergolene in 20 ml. of anhydrous chloroform were added 10 ml. of methanol and 1.0 ml. of acetic anhydride. The solution was allowed to stand at room temperature for about two hours, and thereafter the solvents were removed by evaporation in vacuo. The residue comprising 4-acetyl-9-keto-7-methyl-$\Delta^{10}$-ergolene was taken up in the minimum amount of warm acetone, and ether was added to induce crystallization. The resulting crystalline precipitate was removed by filtration and recrystallized from a mixture of equal parts of acetone and ethanol. 4-acetyl-9-keto-7-methyl-$\Delta^{10}$-ergolene thus prepared melted at about 169–170° C.

To a solution of 0.25 g. of the acetylated ergolene base in 10 ml. of ethanol was added the theoretical amount of hydrochloric acid, with stirring. A crystalline precipitate of the hydrochloric acid addition salt was formed. It was removed by filtration, and recrystallized from the minimum amount of warm aqueous ethanol. 4-acetyl-9-keto-7-methyl-$\Delta^{10}$-ergolene hydrochloride thus prepared belted at about 250° C. with decomposition.

EXAMPLE 16

*Preparation of 4-acetyl-9-hydroxy-7-methyl-$\Delta^{10}$-ergolene from 4-acetyl-9-keto-7-methyl-$\Delta^{10}$-ergolene*

To a solution of 10 g. of 4-acetyl-9-keto-7-methyl-$\Delta^{10}$-ergolene in a mixture of 150 ml. of methanol and 10 ml. of water were added 1.5 g. of sodium borohydride. The reaction mixture was allowed to stand at room temperature for about two hours. The solution was then concentrated by evaporation in vacuo to a volume of about 20 ml., and a solution of 15 ml. of concentrated hydrochloric acid in 60 ml. of water was added thereto. A precipitate of the hydrochloride salt of 4-acetyl-9-hydroxy-7-methyl-$\Delta^{10}$-ergolene was formed upon cooling the solution. The salt was removed by filtration, was washed with methanol and recrystallized from warm dilute ethanol solution. The purified 4-acetyl-9-hydroxy-7-methyl-$\Delta^{10}$-ergolene hydrochloride melted with decomposition at about 245–246° C.

A solution of 5 g. of the hydrochloride salt in 25 ml. of water was neutralized by the addition of sodium bicarbonate. The neutral solution was extracted with three 10 ml. portions of chloroform. The combined chloroform extracts which contained the free base were dried over anhydrous magnesium sulfate, and the chloroform was removed by evaporation in vacuo. The residue was crystallized by dissolving it in warm ethyl acetate and cooling. 4-acetyl-9-hydroxy-7-methyl-$\Delta^{10}$-ergolene thus prepared melted at about 182–184° C.

To a solution of 1 g. of the above base in 10 ml. of ethanol was added the theoretical amount of aqueous 48 percent hydrobromic acid, whereupon the crystalline hydrobromide salt precipitated. It was separated by filtration and recrystallized from dilute ethanol. The purified 4-acetyl-9-hydroxy-7-methyl-$\Delta^{10}$-ergolene hydrobromide melted with decomposition at about 243–244° C.

EXAMPLE 17

*Preparation of 4-acetyl-9-epi hydroxy-7-methyl-$\Delta^{10}$-ergolene*

A solution of 0.5 g. of 4-acetyl-9-hydroxy-7-methyl-$\Delta^{10}$-ergolene hydrochloride in 15 ml. of concentrated hydrochloric acid was kept at 25° C. for about two hours. The excess of hydrochloric acid was removed by evaporation in vacuo, and the residue was neutralized with aqueous 5 percent sodium bicarbonate. The neutral solution was extracted with three 10 ml. portions of chloroform, and the combined chloroform extracts were dried over magnesium sulfate. The chloroform was removed by distillation in vacuo, and the residue consisting of 4-acetyl-9-epi hydroxy-7-methyl-$\Delta^{10}$-ergolene, was crystallized from warm ethyl acetate. The substance melted with decomposition at about 194–196° C.

To a solution of 0.25 g. of 4-acetyl-9-epi hydroxy-7-methyl-$\Delta^{10}$-ergolene in 10 ml. of ethanol was added a slight excess of hydrochloric acid. The solution was cooled and a precipitate of the hydrochloric acid addition salt of the base separated. It was removed by filtration and was recrystallized from the minimum amount of warm dilute ethanol. 4-acetyl-9-epi hydroxy-7-methyl-$\Delta^{10}$-ergolene hydrochloride thus prepared melted with decomposition at about 195° C.

Other non-oxidizing strong mineral acids can be used in the process of converting the normal 9-hydroxy ergolene to the 9-epi-hydroxy ergolene, as, for example, sulfuric acid, hydrobromic acid, trichloroacetic acid, and the like.

Although the temperature at which the inversion from normal to epi-hydroxy ergolene form is not critical, it will be evident that increasing the temperature will tend to hasten the reaction, while also increasing the rate of formation of by-products. Preferably temperatures ranging from about 20° C. to 100° C. are employed in effecting the conversion.

Other 4-acyl-9-hydroxy-$\Delta^{10}$-ergolenes, as described in Example 8, can be epimerized by the procedure of this example to produce the corresponding 4-acyl-9-epi hydroxy-$\Delta^{10}$-ergolenes.

EXAMPLE 18

*Preparation of 4-acetyl-9-chloro-7-methyl-$\Delta^{10}$-ergolene hydrochloride from 4-acetyl-9-epi hydroxy-7-methyl-$\Delta^{10}$-ergolene hydrochloride*

One gram of 4-acetyl-9-epi hydroxy-7-methyl-$\Delta^{10}$-ergolene hydrochloride was dissolved in about 25 ml. of liquid sulfur dioxide contained in a glass-lined autoclave. One-half ml. of thionyl chloride was added thereto, and the vessel was sealed and kept at 25° C. for about five hours. The autoclave was then cooled and vented, and the sulfur dioxide was allowed to evaporate from the reaction mixture while keeping the volume of the solution constant by slow addition of dry ether. An amorphous precipitate of 4-acetyl-9-chloro-7-methyl-$\Delta^{10}$-ergolene hydrochloride formed. It was removed by filtration, washed well with ether and dried in vacuo. The substance which melted with decomposition at 130–135° C. was identical with the material prepared by the procedure of Example 9.

Other 4-acyl-9-epi hydroxy-$\Delta^{10}$-ergolenes, as described in Example 17, can be used as starting materials in the procedure of this example to produce the corresponding 4-acyl-9-chloro-$\Delta^{10}$-ergolenes.

EXAMPLE 19

*Preparation of 7-methyl-9-carboxy-$\Delta^{10}$-ergolene*

A solution of 1 g. of 7-methyl-9-carbomethoxy-$\Delta^{10}$-ergolene in a mixture of 30 ml. of 12 N HCl and 5 ml.

of water was heated under reflux for three hours. The light yellow reaction mixture was evaporated to dryness under reduced pressure on a steam bath. The white residue consisting of the dihydrochloride salt of 7-methyl-9-carboxy-$\Delta^{10}$-ergolene was slurred with 25 ml. of ethanol and the ethanol evaporated to remove excess hydrogen chloride. The 7-methyl-9-carboxy-$\Delta^{10}$-ergolene dihydrochloride formed in the reaction was a white crystalline powder. It was dissolved in 20 ml. of water and was passed through a 10-inch column of a quaternary ammonium cation exchange resin ("IR-45") to remove chloride ion. The resin was washed with several 30 ml. portions of water and the eluate was evaporated to dryness. The white residue from evaporation was slurred with 20 ml. of methanol, filtered, washed with methanol and ether and dried in vacuo. The white crystalline 7-methyl-9-carboxy-$\Delta^{10}$-ergolene obtained had no definite melting point, but slowly decomposed when heated over the range of 250–350° C.

EXAMPLE 20

*Alternative preparation of 7-methyl-9-carboxy-$\Delta^{10}$-ergolene*

Two grams of 4-acetyl-7-methyl-9-cyano-$\Delta^{10}$-ergolene were dissolved in 40 ml. of concentrated hydrochloric acid and heated under reflux for about 16 hours. By following the isolation procedure described in Example 19, 7-methyl-9-carboxy-$\Delta^{10}$-ergolene was obtained.

Other strong, non-oxidizing mineral acids such as hydrobromic acid, sulfuric acid and the like can be employed to effect the conversion of 4-acyl-7-alkyl-9-cyano-$\Delta^{10}$-ergolenes to 7-alkyl-9-carboxy-$\Delta^{10}$-ergolenes. Thus, the 4-acyl-7-alkyl-9-cyano-$\Delta^{10}$-ergolenes described in Example 10 can be used in the procedure, to produce the corresponding 7-alkyl-9-carboxy-$\Delta^{10}$-ergolenes and their acid addition salts.

EXAMPLE 21

*Preparation of dl-lysergic acid from 9-carboxy-7-methyl-$\Delta^{10}$-ergolene*

400 mg. of 9-carboxy-7-methyl-$\Delta^{10}$-ergolene were dissolved in 15 ml. of water containing 124 mg. of potassium hydroxide. 1.81 g. of deactivated Raney nickel were added, and the mixture was refluxed under nitrogen for about twenty hours. About 0.5 g. of activated decolorizing carbon was added to the cooled reaction mixture, the mixture was shaken and was filtered. The filtrate was acidified to about pH 5.6 with hydrochloric acid whereupon dl-lysergic acid precipitated. The precipitate was dissolved in a minimum amount of dilute ammonia and Dry Ice was added to the solution. The dl-lysergic acid which separated was filtered off and dried in a vacuum desiccator.

As was disclosed in Example 13, an amount of sodium arsenate can also be used in the above procedure, in which case an improved yield of dl-lysergic acid can be obtained. The sodium arsenate appears to act either by further deactivating the Raney nickel or by serving as a hydrogen acceptor. Whatever the reason, a greater amount of dehydrogenation of the starting dihydro compound is effected. In addition to sodium arsenate, other agents known to deactivate Raney nickel or to act as hydrogen acceptors can be employed. Such include halides, maleates, cinnamates and the like.

We claim:

1. In the process of preparing a compound of the group consisting of lysergic acid and homologues thereof, the step which comprises reacting with a halogen of the group consisting of chlorine and bromine, a compound having the formula

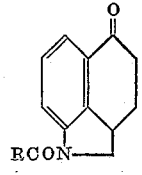

wherein R represents a radical of the group consisting of alkyl radicals having from one to eight carbon atoms, monocarbocyclic aromatic radicals, and monocarbocyclic aromatic-substituted lower alkyl radicals, thereby to introduce said halogen in the position adjacent the keto group.

2. In the process of preparing a compound of the group consisting of lysergic acid and homologues thereof, the step which comprises heating together in inert solvent solution a polyhydrobenz[cd]indole represented by the formula

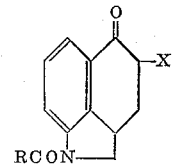

wherein R represents a radical of the group consisting of alkyl radicals having from one to eight carbon atoms, monocarbocyclic aromatic radicals, and monocarbocyclic aromatic-substituted lower alkyl radicals, and X represents a halogen of the class consisting of chlorine and bromine, and a ketal represented by the formula

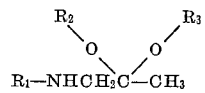

wherein $R_1$ represents an alkyl radical having from one to eight carbon atoms, $R_2$ and $R_3$ each represent a lower alkyl radical and when taken together $R_2$ and $R_3$ represent a polymethylene chain having from two to three carbon atoms.

3. The process step according to claim 2, in which the polyhydrobenz[cd]indole is represented by the formula

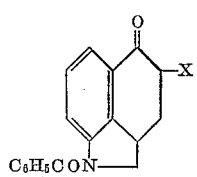

wherein X is a halogen of the group consisting of chlorine and bromine.

4. The process step according to claim 2, in which the polyhydrobenz[cd]indole is represented by the formula

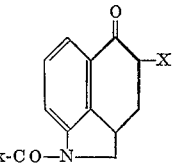

wherein X is a halogen of the class consisting of chlorine and bromine, and alk represents an alkyl radical having from one to eight carbon atoms.

5. In the process of preparing a compound of the group consisting of lysergic acid and homologues thereof, the step which comprises subjecting to the action of a non-oxidizing strong mineral acid an aminoacetone ketal substituted polyhydrobenz[cd]indole represented by the formula

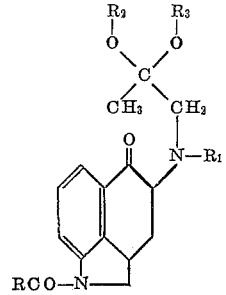

wherein R represents a member of the group consisting of alkyl radicals having from one to eight carbon atoms, monocarbocyclic aromatic radicals, and monocarbocyclic-substituted lower alkyl radicals, $R_1$ represents an alkyl radical having from 1 to 8 carbon atoms, $R_2$ and $R_3$ each represent a lower alkyl radical, and $R_2$ and $R_3$ taken together represent a polymethylene chain having from two to three carbon atoms.

6. The process step according to claim 5, in which the substituted polyhydrobenz[cd]indole is represented by the formula

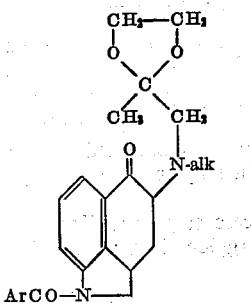

wherein alk represents a lower alkyl radical and Ar represents a monocarbocyclic aromatic radical.

7. The process step according to claim 5, wherein the substituted polyhydrobenz[cd]indole is N-benzoyl-5-keto-4-(N - methyl-N-acetonyl) - amino-1,2,2a,3,4,5-hexahydrobenz[cd]indole ethylene ketal.

8. In the process of preparing a compound of the group consisting of lysergic acid and homologues thereof, the step which comprises reacting with a strong alkali a substituted polyhydrobenz[cd]indole represented by the formula

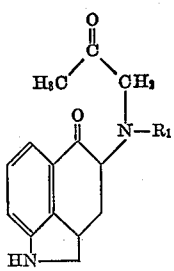

wherein $R_1$ represents an alkyl radical having from one to eight carbon atoms.

9. The process according to claim 8, wherein the polyhydrobenz[cd]indole is 5-keto-4-(N-methyl-N-acetonyl)-amino-1,2,2a,3,4,5-hexahydrobenz[cd]indole.

10. In the process of preparing a compound of the group consisting of lysergic acid and homologues thereof, the step which comprises hydrogenating a 9-keto-$\Delta^{10}$-ergolene represented by the formula

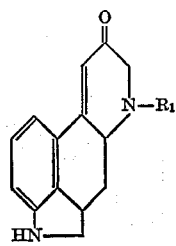

wherein $R_1$ represents an alkyl radical having from one to eight carbon atoms, thereby to produce a 7-alkyl-9-hydroxy-$\Delta^{10}$-ergolene.

11. The process step according to claim 10, wherein the 9-keto-$\Delta^{10}$-ergolene is 7-methyl-9-keto-$\Delta^{10}$-ergolene.

12. In the process of preparing a compound of the group consisting of lysergic acid and homologues thereof, the step which comprises subjecting a 7-alkyl-9-keto-$\Delta^{10}$-ergolene represented by the formula

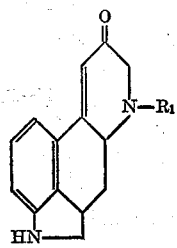

wherein $R_1$ represents an alkyl radical having from one to eight carbon atoms, to the action of an acylating agent of the group consisting of acid anhydrides represented by the formula $$(RCO)_2O$$

wherein R represents a member of the group consisting of alkyl radicals having from one to eight carbon atoms, monocarbocyclic aromatic radicals, and monocarbocyclic aromatic-substituted lower alkyl radicals.

13. The process step according to claim 12, wherein the 7-alkyl-9-keto-$\Delta^{10}$-ergolene is 7-methyl-9-keto-$\Delta^{10}$-ergolene and the acylating agent is acetic anhydride.

14. In the process of preparing a compound of the group consisting of lysergic acid and homologues thereof, the step which comprises subjecting a 9-hydroxy-$\Delta^{10}$-ergolene represented by the formula

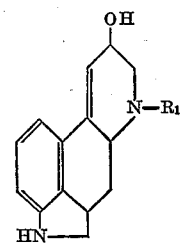

wherein $R_1$ represents an alkyl radical having from one to eight carbon atoms, to the action of an acylating agent of the group consisting of acid anhydrides represented by the formula $$(RCO)_2O$$

wherein R represents a member of the group consisting of alkyl radicals having from one to eight carbon atoms, monocarbocyclic aromatic radicals, and monocarbocyclic aromatic-substituted lower alkyl radicals.

15. The process step according to claim 14, wherein the 9-hydroxy-$\Delta^{10}$-ergolene is 7-methyl-9-hydroxy-$\Delta^{10}$-ergolene.

16. The process step according to claim 14, wherein the acylating agent is benzoic anhydride.

17. The process step according to claim 14, wherein the acylating agent is acetic anhydride.

18. In the process of preparing a compound of the group consisting of lysergic acid and homologues thereof, the step which comprises hydrogenating a 4-acyl-9-keto-$\Delta^{10}$-ergolene represented by the formula

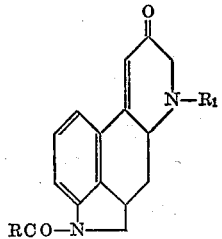

wherein R represents a radical of the group consisting of alkyl radicals having from one to eight carbon atoms, monocarbocyclic aromatic, and monocarbocyclic aromatic-substituted lower alkyl radicals, and $R_1$ represents an alkyl radical having from one to eight carbon atoms, thereby to produce a compound having the formula

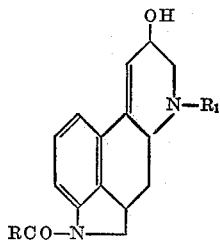

wherein R and R₁ have the same significance as before.

19. The process step according to claim 18, wherein the 4-acyl-9-keto-Δ¹⁰-ergolene is represented by the formula

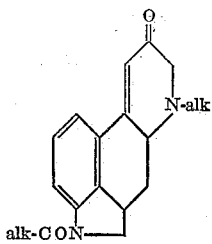

wherein alk signifies a lower alkyl radical.

20. The process step according to claim 18, wherein the 4-acyl-9-keto-Δ¹⁰-ergolene is 4-acetyl-9-keto-7-methyl-Δ¹⁰-ergolene.

21. In the process of preparing a compound of the group consisting of lysergic acid and homologues thereof, the step which comprises replacing with a halogen of the group consisting of chlorine and bromine the 9-hydroxy group of an acid addition salt of a 9-hydroxy-Δ¹⁰-ergolene having the formula

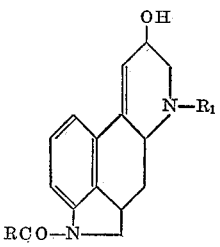

wherein R represents a radical of the group consisting of alkyl radicals having from one to eight carbon atoms, monocarbocyclic aromatic and monocarbocyclic aromatic-substituted lower alkyl radicals; and R₁ represents an alkyl radical having from one to eight carbon atoms, to produce a 9-halo-Δ¹⁰-ergolene.

22. The process step according to claim 21, wherein the 9-hydroxy-Δ¹⁰-ergolene is represented by the formula

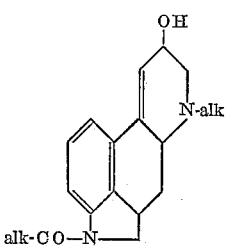

wherein alk represents a lower alkyl radical.

23. The process step according to claim 21, wherein the 9-hydroxy-Δ¹⁰-ergolene is 4-acetyl-9-hydroxy-7-methyl-Δ¹⁰-ergolene.

24. In the process of preparing a compound of the group consisting of lysergic acid and homologues thereof, the step which comprises reacting with a metal salt of hydrocyanic acid, an acid addition salt of an acylated 9-halo-Δ¹⁰-ergolene represented by the formula

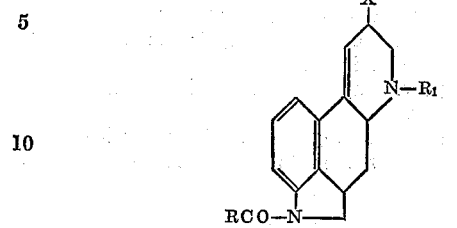

wherein X represents a halogen of the group consisting of chlorine and bromine, R represents a radical of the group consisting of alkyl radicals having from one to eight carbon atoms, monocarbocyclic aromatic, and monocarbocyclic aromatic-substituted lower alkyl radicals, and R₁ represents an alkyl radical having from one to eight carbon atoms.

25. The process step according to claim 24, wherein the 9-halo-Δ¹⁰-ergolene is represented by the formula

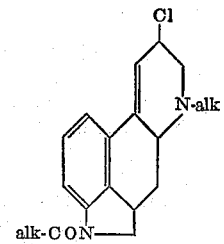

wherein alk represents a lower alkyl radical.

26. The process step according to claim 24, wherein the 9-halo-Δ¹⁰-ergolene is represented by the formula

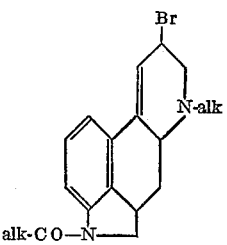

wherein alk represents a lower alkyl radical.

27. The process step according to claim 24, wherein the 9-halo-Δ¹⁰-ergolene is 4-acetyl-7-methyl-9-chloro-Δ¹⁰-ergolene.

28. In the process of preparing a compound of the group consisting of lysergic acid and homologues thereof, the step which comprises alcoholysis by means of a lower alkanol and acid, of a 9-cyano-Δ¹⁰-ergolene represented by the formula

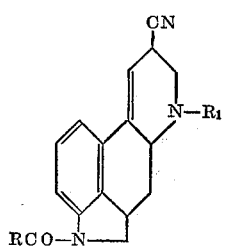

wherein R represents a radical of the group consisting of alkyl radicals having from one to eight carbon atoms, monocarbocyclic aromatic and monocarbocyclic aromatic-substituted lower alkyl radicals, and R₁ represents an alkyl radical having from one to eight carbon atoms.

29. The process step according to claim 28, wherein the 9-cyano-Δ10-ergolene is represented by the formula

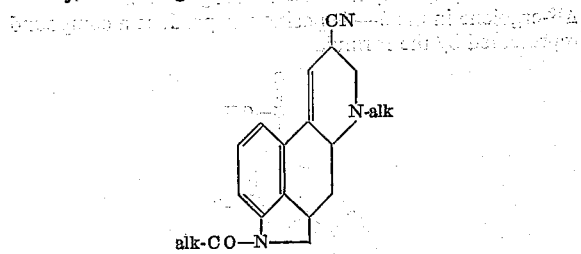

wherein alk represents a lower alkyl radical.

30. The process step according to claim 28, wherein the alkanol is methanol and the acid is sulfuric acid.

31. The process step according to claim 28, wherein the 9-cyano-Δ10-ergolene is 4-acetyl-7-methyl-9-cyano-Δ10-ergolene.

32. In the process of preparing a compound of the group consisting of lysergic acid and homologues thereof, the step which comprises hydrolyzing a 9-carbalkoxy-Δ10-ergolene represented by the formula

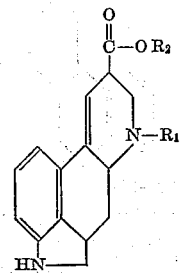

wherein $R_1$ represents an alkyl radical having from one to eight carbon atoms, and $R_2$ represents a lower alkyl radical.

33. The process step according to claim 32, wherein the 9-carbalkoxy-Δ10-ergolene is 9-carbomethoxy-7-methyl-Δ10-ergolene.

34. In the process of preparing a compound of the group consisting of lysergic acid and homologues thereof, the step which comprises dehydrogenating with deactivated Raney nickel catalyst, a carboxy-Δ10-ergolene represented by the formula

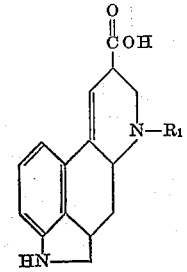

wherein $R_1$ represents an alkyl radical having from one to eight carbon atoms, whereby a double bond is introduced in the 5—5a position of the compound to produce a compound represented by the formula

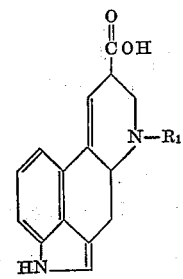

wherein $R_1$ has the same significance as before.

35. A process step according to claim 34 is which $R_1$ in the formula of said claim is a lower alkyl radical.

36. The process step according to claim 34, wherein the carboxy-Δ10-ergolene is 7-methyl-9-carboxy-Δ10-ergolene.

37. In the process of preparing a compound of the group consisting of lysergic acid and homologues thereof, the step which comprises epimerizing with a strong non-oxidizing acid, the 9-hydroxy group of an acid addition salt of a 9-hydroxy-Δ10-ergolene represented by the formula

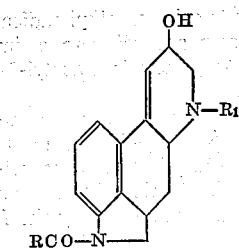

wherein R represents a radical of the group consisting of alkyl radicals having from one to eight carbon atoms, monocarbocyclic aromatic and monocarbocyclic aromatic-substituted lower alkyl radicals; and $R_1$ represents an alkyl radical having from one to eight carbon atoms.

38. The process step according to claim 37, wherein the 9-hydroxy-Δ10-ergolene is represented by the formula

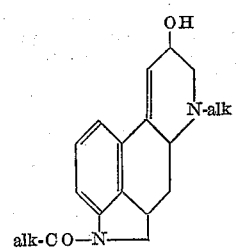

wherein alk represents a lower alkyl radical.

39. The process step according to claim 37, wherein the 9-hydroxy-Δ10-ergolene is 4-acetyl-9-hydroxy-7-methyl-Δ10-ergolene.

40. In the process of preparing a compound of the group consisting of lysergic acid and homologues thereof, the step which comprises replacing with a halogen of the group consisting of chlorine and bromine the 9-epihydroxy group of an acid addition salt of a 9-epihydroxy-Δ10-ergolene represented by the formula

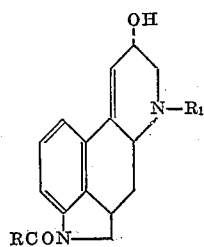

wherein R represents a radical of the group consisting of radicals having from one to eight carbon atoms, monocarbocyclic aromatic and monocarbocyclic aromatic-substituted lower alkyl radicals; and $R_1$ represents an alkyl radical having from one to eight carbon atoms, to produce a 9-halo-Δ10-ergolene.

41. The process step according to claim 40, wherein the 9-epihydroxy-$\Delta^{10}$-ergolene is represented by the formula

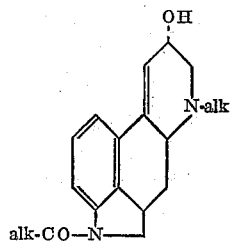

wherein alk represents a lower alkyl radical.

42. The process step according to claim 40, wherein the 9-epihydroxy-$\Delta^{10}$-ergolene is 4-acetyl-9-epihydroxy-7-methyl-$\Delta^{10}$-ergolene.

43. In the process of preparing a compound of the group consisting of lysergic acid and homologues thereof, the step which comprises treating with boron trifluoride, in liquid hydrocyanic acid solution, an acylated 9-hydroxy-$\Delta^{10}$-ergolene represented by the formula

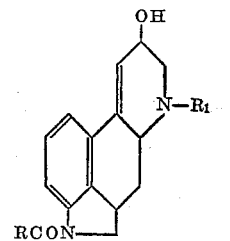

wherein R represents a radical of the group consisting of alkyl radicals having from one to eight carbon atoms, monocarbocyclic aromatic and monocarbocyclic aromatic-substituted lower alkyl radical; and $R_1$ represents an alkyl radical having from one to eight carbon atoms, to produce a 9-cyano-$\Delta^{10}$-ergolene.

44. The process step according to claim 43, wherein the acylated 9-hydroxy-$\Delta^{10}$-ergolene is represented by the formula

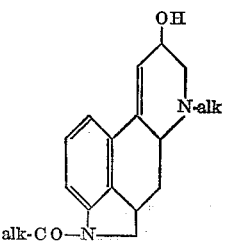

wherein alk represents a lower alkyl radical.

45. The process step according to claim 43, wherein the acylated 9-hydroxy-$\Delta^{10}$-ergolene is 4-acetyl-9-hydroxy-7-methyl-$\Delta^{10}$-ergolene.

46. In the process of preparing a compound of the group consisting of lysergic acid and homologues thereof, the step which comprises sequentially subjecting to the action of strong base and deactivated Raney nickel catalyst, an acylated 9-cyano-$\Delta^{10}$-ergolene represented by the formula

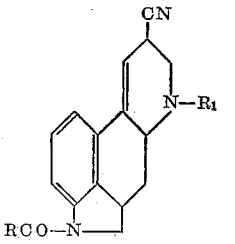

wherein R represents a radical of the group consisting of alkyl radicals having from one to eight carbon atoms, monocarbocyclic aromatic and monocarbocyclic aromatic-substituted lower alkyl radicals, and $R_1$ represents an alkyl radical having from one to eight carbon atoms, to deacylate, hydrolyze, and dehydrogenate said 9-cyano-$\Delta^{10}$-ergolene in the 5—5$^a$-position to produce a compound represented by the formula

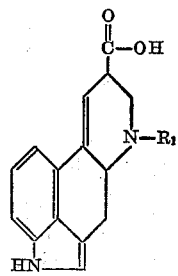

wherein $R_1$ represents an alkyl radical having from one to eight carbon atoms.

47. The process step according to claim 46, wherein the acylated 9-cyano-$\Delta^{10}$-ergolene is represented by the formula

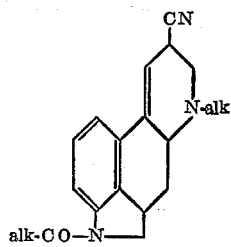

wherein alk represents a lower alkyl radical.

48. The process step according to claim 46, wherein the 9-cyano-$\Delta^{10}$-ergolene is 4-acetyl-7-methyl-9-cyano-$\Delta^{10}$-ergolene.

49. In the process of preparing a compound of the group consisting of lysergic acid and homologues thereof, the step which comprises heating with a strong non-oxidizing acid a 4-acyl-9-cyano-7-alkyl-$\Delta^{10}$-ergolene represented by the formula

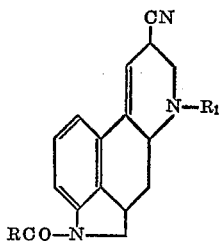

wherein R represents a radical of the group consisting of alkyl radicals having from one to eight carbon atoms, monocarbocyclic aromatic, and monocarbocyclic aromatic-substituted lower alkyl radicals, and $R_1$ represents an alkyl radical having from one to eight carbon atoms, to produce the corresponding 9-carboxy-7-alkyl-$\Delta^{10}$-ergolene acid addition salt.

50. The process step according to claim 49, wherein the ergolene is 4-acetyl-9-cyano-7-methyl-$\Delta^{10}$-ergolene.

51. A compound of the class consisting of acyl derivatives and acid addition salts of a base represented by the formula

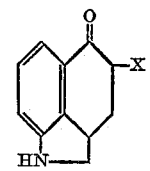

wherein X is chosen from the class consisting of chlorine and bromine atoms.

52. N-benzoyl-4-bromo-5-keto-1,2,2a,3,4,5-hexahydrobenz[cd]indole.

53. N-acetyl-4-bromo-5-keto-1,2,2a,3,4,5 - hexahydrobenz[cd]indole.

54. A compound of the class consisting of acyl derivatives of a base represented by the formula

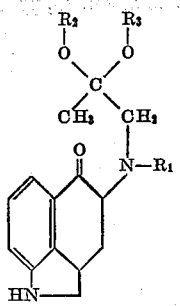

wherein $R_1$ represents an alkyl radical having from one to eight carbon atoms, $R_2$ and $R_3$ each represent a lower alkyl radical, and $R_2$ and $R_3$ taken together represent a polymethylene chain having from two to three carbon atoms.

55. A compound of the class consisting of a base and the acid addition salts thereof, said base being represented by the formula

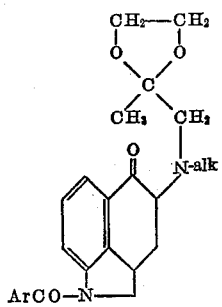

wherein alk represents an alkyl radical having from one to eight carbon atoms and Ar represents a monocarbocyclic aromatic radical.

56. N-benzoyl-5-keto-4-(N-methyl-N-acetonyl)-amino-1,2,2a,3,4,5-hexahydrobenz[cd]indole ethylene ketal.

57. A compound of the class consisting of a base and the acid addition salts thereof, said base being represented by the formula

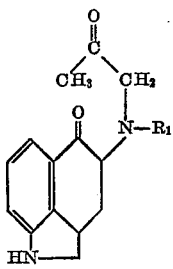

wherein $R_1$ represents an alkyl radical having from one to eight carbon atoms.

58. 5-keto-4-(N-methyl-N-acetonyl)-amino - 1,2,2a,3,4, 5-hexahydrobenz[cd]indole.

59. A compound of the class consisting of a base and the acid addition salts thereof, said base being represented by the formula

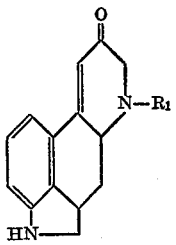

wherein $R_1$ represents an alkyl radical having from one to eight carbon atoms; and N-carboxyacyl derivatives thereof.

60. 7-methyl-9-keto-$\Delta^{10}$-ergolene.

61. A compound of the group consisting of a base and the acid addition salts thereof, said base being represented by the formula

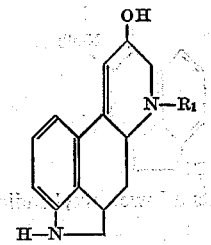

wherein $R_1$ represents an alkyl radical having from one to eight carbon atoms; and 9-epimers and N-carboxyacyl derivatives thereof.

62. 9-hydroxy-7-methyl-$\Delta^{10}$-ergolene.
63. 9-epihydroxy-7-methyl-$\Delta^{10}$-ergolene.
64. 4-acetyl-9-hydroxy-7-methyl-$\Delta^{10}$-eroglene.
65. 4-acetyl-9-hydroxy-7-methyl - $\Delta^{10}$ - ergolene hydrochloride.

66. An acid addition salt of an N-carboxyacylated base, said base being represented by the formula

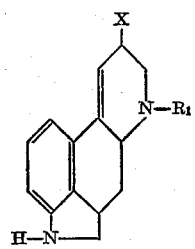

wherein X is a halogen of the group consisting of chlorine and bromine, and $R_1$ represents an alkyl radical having from one to eight carbon atoms.

67. 4 - acetyl-9-chloro-7-methyl$\Delta^{10}$-ergolene hydrochloride.
68. 4 - acetyl-9-bromo-7-methyl-$\Delta^{10}$-ergolene hydrobromide.

69. A compound of the group consisting of N-carboxyacyl derivatives of a base, and the acid addition salts thereof, the said base being represented by the formula

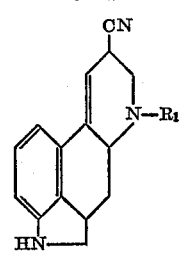

wherein $R_1$ represents an alkyl radical having from one to eight carbon atoms.

70. 4-acetyl-9-cyano-7-methyl-$\Delta^{10}$-ergolene.

71. A compound of the group consisting of a base, N-carboxyacyl derivatives of said base, and the acid addition salts thereof, the said base being represented by the formula

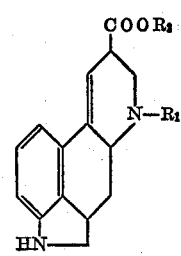

wherein R₁ represents an alkyl radical having from one to eight carbon atoms; R₂ represents a member of the group consisting of hydrogen and lower alkyl radicals.

72. A base represented by the formula

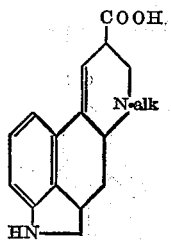

wherein alk represents a lower alkyl radical.

73. 9-carboxy-7-methyl-$\Delta^{10}$-ergolene.
74. 9-carbomethoxy-7-methyl-$\Delta^{10}$-ergolene.

References Cited in the file of this patent

Uhle J. Am. Chem. Soc., vol. 73, pp. 2402–2403 (1951).